United States Patent
Sung et al.

(10) Patent No.: US 10,044,521 B2
(45) Date of Patent: Aug. 7, 2018

(54) METHODS AND SYSTEMS FOR INCREASING WIRELESS COMMUNICATION THROUGHPUT OF A BONDED VPN TUNNEL

(71) Applicant: Pismo Labs Technology Limited, Hong Kong (HK)

(72) Inventors: Patrick Ho Wai Sung, Hong Kong (HK); Kam Chiu Ng, Hong Kong (HK); Ho Ming Chan, Hong Kong (HK)

(73) Assignee: PISMO LABS TECHNOLOGY LIMITED, Hong Kong (HK)

(*) Notice: Subject to any disclaimer, the term of this patent is extended or adjusted under 35 U.S.C. 154(b) by 0 days.

(21) Appl. No.: 15/442,721

(22) Filed: Feb. 27, 2017

(65) Prior Publication Data
US 2017/0170981 A1 Jun. 15, 2017

Related U.S. Application Data

(63) Continuation of application No. 14/585,202, filed on Dec. 30, 2014, now Pat. No. 9,584,414, and a continuation of application No. 12/646,774, filed on Dec. 23, 2009, now Pat. No. 9,019,827.

(51) Int. Cl.
*H04L 12/28* (2006.01)
*H04L 12/46* (2006.01)

(52) U.S. Cl.
CPC ...... *H04L 12/2863* (2013.01); *H04L 12/4633* (2013.01); *H04L 12/4641* (2013.01)

(58) Field of Classification Search
CPC .......... H04L 45/74; H04L 47/52; H04L 69/22
See application file for complete search history.

(56) References Cited

U.S. PATENT DOCUMENTS

| | | | |
|---|---|---|---|
| 6,810,377 B1* | 10/2004 | Ho | G10L 19/005 704/208 |
| 7,006,500 B1 | 2/2006 | Pedersen et al. | |
| 7,406,082 B2* | 7/2008 | Nagarajan | H04L 45/00 370/394 |
| 7,586,899 B1* | 9/2009 | Mohaban | H04L 29/06027 370/352 |
| 7,760,636 B1* | 7/2010 | Cheriton | H04L 1/1874 370/230 |
| 7,787,370 B1* | 8/2010 | Aweya | H04L 45/245 370/230 |
| 7,796,602 B2* | 9/2010 | Guo | H04L 47/10 370/394 |
| 8,493,867 B1* | 7/2013 | Cheriton | H04L 1/1874 370/236 |

(Continued)

*Primary Examiner* — Mounir Moutaouakil
(74) *Attorney, Agent, or Firm* — Hershkovitz & Associates, PLLC; Abe Hershkovitz

(57) ABSTRACT

The present disclosure provides for devices, systems, and methods which optimize throughput of bonded connections over multiple variable bandwidth logical paths by adjusting a tunnel bandwidth weighting schema during a data transfer session in response to a change in bandwidth capabilities of one or more tunnels. By making such adjustments, embodiments of the present invention are able to optimize the bandwidth potential of multiple connections being used in a session, while minimizing the adverse consequences of reduced bandwidth issues which may occur during the data transfer session.

18 Claims, 4 Drawing Sheets

(56) References Cited

U.S. PATENT DOCUMENTS

| | | | |
|---|---|---|---|
| 9,019,827 B1* | 4/2015 | Chan | H04L 12/2863 370/232 |
| 9,531,508 B2* | 12/2016 | Chan | H04L 12/4633 |
| 2003/0072269 A1 | 4/2003 | Teruhi et al. | |
| 2003/0108034 A1 | 6/2003 | Yu | |
| 2003/0167342 A1 | 9/2003 | Munger et al. | |
| 2004/0236855 A1* | 11/2004 | Peles | H04L 29/06 709/227 |
| 2007/0055498 A1* | 3/2007 | Kapilow | G10L 19/005 704/206 |
| 2007/0100776 A1 | 5/2007 | Shah et al. | |
| 2008/0080533 A1* | 4/2008 | Yamane | H04L 12/4641 370/401 |
| 2008/0320156 A1 | 12/2008 | Chen et al. | |
| 2009/0240490 A1* | 9/2009 | Kim | G10L 19/005 704/207 |
| 2009/0310485 A1* | 12/2009 | Averi | H04L 45/00 370/232 |
| 2010/0027419 A1 | 2/2010 | Padhye et al. | |
| 2010/0039937 A1* | 2/2010 | Ramanujan | H04L 47/10 370/232 |
| 2012/0314578 A1* | 12/2012 | Averi | H04L 45/00 370/235 |

* cited by examiner

| Type | Data 1 | Data 2 |
|---|---|---|
| BWOPT_VERSION (0x01) | Version of this packet. Currently it is 1. | Nil |
| BWOPT_MAX_WAN (0X02) | Maximum number of WAN connections on the sender | Nil |
| BWOPT_WAN_MAXBW (0X03) | Number of 32 bit words in the Data filed | WAN connection's maximum downlink bandwidth in kbyte per sec. 32-bit word for each WAN. |
| BWOPT_DROP_RATE (0X04) | Number of 32-bit words in the Data field. This must be 2. | First 32-bit word is the number of packet dropped. Second 32-bit word is the total packet received. |

*FIG. 4B*

METHODS AND SYSTEMS FOR INCREASING WIRELESS COMMUNICATION THROUGHPUT OF A BONDED VPN TUNNEL

RELATED APPLICATIONS

The present application is a non-provisional Continuation application of non-provisional application Ser. No.14/585,202 titled "THROUGHPUT OPTIMIZATION FOR BONDED VARIABLE BANDWIDTH CONNECTIONS" filed on 30 Dec. 2014, which is a non-provisional Continuation application of non-provisional application Ser. No. 12/646,774, now U.S. Pat. No. 9,019,827, titled "Throughput Optimization for Bonded Variable Bandwidth Connections" filed on 23 Dec. 2009, and priority is claimed thereto.

TECHNICAL FIELD

The present application is related to data communication, and more specifically to optimizing throughput of data transfer over multiple logical paths.

BACKGROUND ART

A multi Wide Area Network (WAN) Site-to-Site VPN router is a router that supports aggregating the bandwidth of multiple interconnections, e.g., WAN connections for accessing one or more remote private networks. In some implementations, each TCP/IP session is routed to only one WAN. In this configuration, a single TCP file transfer session can only utilize the bandwidth of one WAN connection on each end. For example, in a session based site-to-site virtual private network (VPN) connection VPN traffic is routed to multiple WAN connections between two sites (e.g., sites A and B). In one implementation, M×N tunnels are initially formed between the WAN connections where M and N are the number of WAN network connections of site A and site B, respectively. Application TCP/IP sessions are then routed over the different tunnels. It is notable, however, that while a session based site-to-site VPN is able to utilize different tunnels for different sessions, a single download session in this type of connection is only able to utilize one tunnel.

In order to increase throughput of single data transfer sessions, routing schemes have been created in an attempt to utilize multiple WAN connections for a single TCP/IP session. In some cases channel bonding is implemented. For example, in bonded site-to-site VPN connections on multi WAN routers, data from a single TCP/IP session is distributed to multiple tunnels. In these arrangements, the M×N tunnels are utilized according to their respective uplink or downlink bandwidth, and the amount of data in a single session that is sent over these tunnels is distributed in proportion to the individual bandwidth ratios of the tunnels. These solutions, however, still fail to realize the optimum bandwidth potential of the multiple tunnels.

For example, suppose the M×N tunnels utilize multiple connections, each of which have different throughput bandwidth capabilities. Current bandwidth distribution schemas base the tunnel bandwidth on either a manually entered value or a static determination regarding the capability of the tunnel made before the transfer. This is partly due to the fact that prior art solutions generally have been applied to devices which have multiple channels that each have fixed bandwidth connections, i.e., each channel is a T1 connection, or each channel is a DSL connection; as opposed to devices which have variable bandwidth connections, i.e., different channels may utilize different types of connections. Additionally, many of these prior art solutions assume the existence of dedicated point-to-point connections between two sites. For example, site A and site B are connected by two T1 lines over two tunnels as opposed to 2×2 tunnels.

Under the current bandwidth distribution schemas some tunnels may experience increased packet drops during a transmission session, and therefore, may not perform according to the determined bandwidth distribution. In this circumstance, the determined bandwidth distribution is not necessarily the optimum bandwidth of the tunnel because the optimum bandwidth has experienced a change. When this occurs, if data continues to be sent at a rate that is higher than an optimum rate for the tunnel, the result will be increased congestion and an increase in dropped packets. As a result, not only does this phenomenon reduce the overall throughput of the bonded connections, it may also result in an overall throughput that is slower than the throughput that would have been realized had only one tunnel been used at least because the dropped packets must be identified and re-transmitted through the network.

DISCLOSURE OF INVENTION

Summary of Invention

Accordingly, the present disclosure provides for devices, systems, and methods which optimize throughput of bonded multiple variable bandwidth connections by adjusting a tunnel bandwidth weighting schema during a data transfer session in response to a change in bandwidth capabilities of one or more tunnels. By making such adjustments, embodiments of the present invention are able to optimize the bandwidth potential of multiple connections being used in a session, while minimizing the adverse consequences of reduced bandwidth issues which may occur during the data transfer session.

According to one embodiment of the present invention, a device is provided for increasing the throughput of a data transfer session. The device may include logic circuitry configured to establish multiple connections, such as multiple WAN connections having different bandwidth capabilities, with a target site. These multiple connections may be utilized to form one or more virtual tunnels between the device and the target site. Logic circuitry may also be included which is configured to assign a weight value, corresponding to a respective bandwidth, to each of the virtual tunnels. Further, the device includes logic circuitry configured to dynamically modify at least one of the respective weight values based on observed transfer activity of data through the one or more virtual tunnels. Such modifications may include decreasing the respective weight value of a tunnel in response to observing bandwidth underperformance, e.g., increases in packet loss. Modifications may also include increasing the respective weight value in response to observing improvements in bandwidth properties for the tunnel. Such increases may be implemented in predetermined step sizes, may be proportionate to a newly measured packet drop rate, and/or may be increased at a rate which is based on other factors.

Observations regarding transfer activity may include encapsulating each JP packet transferred through a tunnel with a per-tunnel sequence number and monitoring the sequence numbers on a receiving end of the transfer to determine whether packet loss has occurred. The results of such observations may be encapsulated in a feedback packet to the transmission end, at which point the transmitting router may modify activity which is directed to a particular tunnel. Embodiments may make observations and transmit feedback in a continuous manner, at specified time intervals, etc.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF DRAWINGS

For a more complete understanding of the present invention, reference is now made to the following descriptions taken in conjunction with the accompanying drawings, in which:

FIG. 4B is a chart that illustrates possible values for the fields of the feedback packet of FIG. 4A.

DETAILED DESCRIPTION

Figure 1:
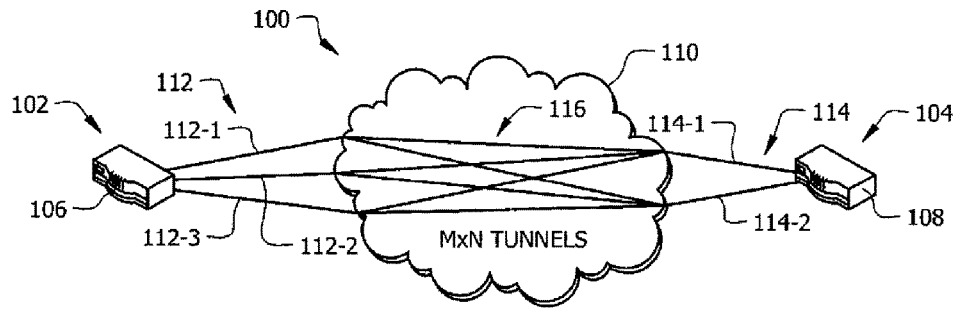
FIG. 1 illustrates an overall system for optimizing throughput of multiple variable bandwidth connections in accordance with an embodiment of the present invention.

FIG. 1 illustrates system 100 adapted according to embodiments configured to optimize the throughput of bonded multiple variable bandwidth connections by adjusting a tunnel bandwidth weighting schema during a data transfer session. System 100 includes multiple sites 102 and 104, which each comprise at least one communications router 106 and 108. Communication routers 106 and 108 may be embodied as multi WAN routers which support aggregating the bandwidth of multiple Internet connections. Communications routers 106 and 108 are connected over network 110. Network 110 may comprise a local area network (LAN), metropolitan area network (MAN), wide area network (WAN), wireless network, the public switched telephone network (PSTN), the Internet, an intranet, an extranet, etc.

Site 102 and router 106 may comprise M connections 112, and site 104 and router 108 may comprise N connections 114. Connections 112 and 114 are data connections for communicating information within network 110 between sites 102 and 104. In the illustrated embodiment, M is equal to 3 and N is equal to 2; however, these values may vary according to desired routers and configurations. Connections 112 and 114 may have similar or differing bandwidth capabilities. Further, connections 112 and 114 may comprise different types of WAN connections, such as a WiFi, cable, DSL, T1, 3G, 4G, satellite connections, and the like. It is also noted that site 102 and site 104 may be thought of as both a sender or receiver, and discussions regarding the functionality of either site may be implemented on the other site. In other words, system 100 may be implemented as a symmetrical network.

Figure 2A:
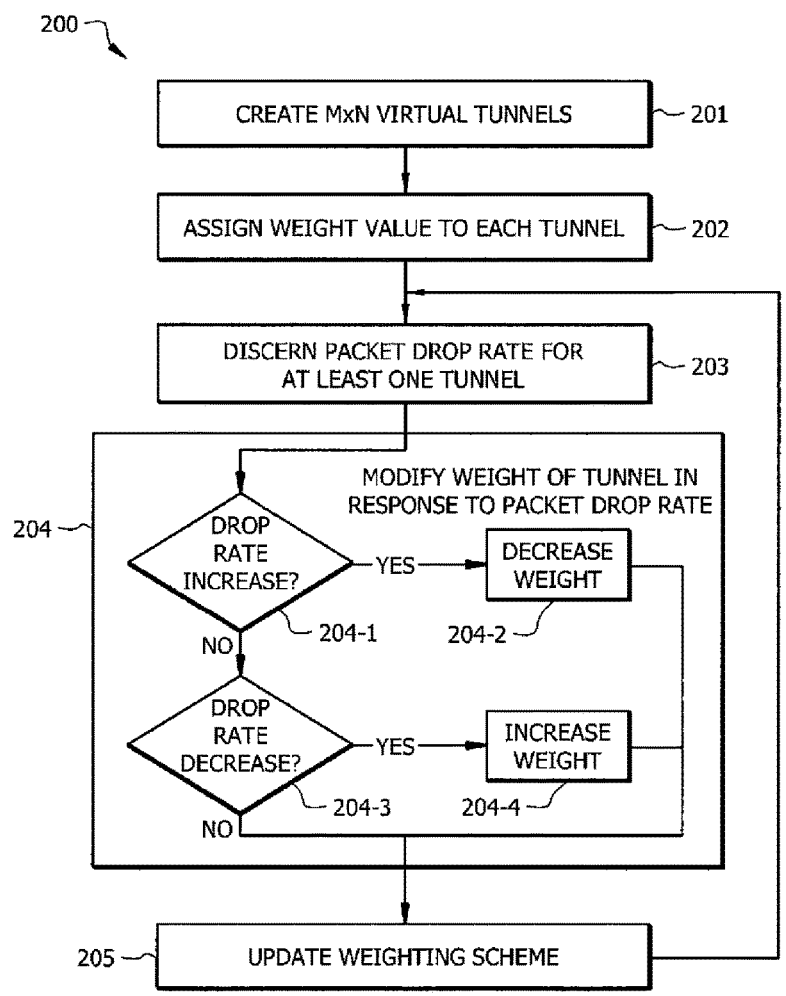
FIG. 2A illustrates a flowchart depicting a method for increasing throughput of a bonded connection in accordance with an embodiment of the present invention.

FIG. 2 shows a high level flow diagram of operation of system 100 depicting a method 200 for increasing throughput of a bonded connection. It should be appreciated that the particular functionality, the order of the functionality, etc. provided in FIG. 2 is intended to be exemplary of operation in accordance with the concepts of the present invention. Accordingly, the concepts herein may be implemented in various ways differing from that of the illustrated embodiment.

At block 201 of the illustrated embodiment when establishing a bonded connection between routers 102 and 104, such as by implementing a bonded site-to-site VPN connection, M×N virtual tunnels 116 may be created. Virtual tunnels 116 correspond to a unique permutation of the network connections of site 102 and the network connections of site 104.

At block 202 of the illustrated embodiment, default weights for the tunnels are determined and/or assigned. To determine default weights embodiments exchange uplink and downlink bandwidth data of connections 112 and 114 between sites 102 and 104. Using this bandwidth data, a default weight may be calculated according to the following: suppose site 102's downlink bandwidths of connections 1 to m are d1, d2, . . . dm, and site 104's uplink bandwidths of connections 1 to n are u1, u2, . . . un; the default weight for the tunnel between site 102's connection X and site 104's connection Y may be defined as $DW(x,y)$, where $DW(x,y)=dx \cdot uy$.

Using the above method to calculate default weight, if connections 112-1 through 112-3 are WAN connections of a multi WAN router with respective uplink/downlink bandwidths of 10 M/6 M, 8 M/4 M, and 6 M/6 M, and connections 114-1 through 114-2 are WAN connections of a multi WAN router with respective uplink/downlink bandwidths of 7 M/5 M and 9 M/3 M, the respective default weights for each tunnel will be as follows:

| For site 102 | For site 104 |
|---|---|
| DW(1, 1) = 6 * 7 = 42 | DW(1, 1) = 5 * 10 = 50 |
| DW(1, 2) = 6 * 9 = 54 | DW(1, 2) = 5 * 8 = 40 |
| DW(2, 1) = 4 * 7 = 28 | DW(1, 3) = 5 * 6 = 30 |
| DW(2, 2) = 4 * 9 = 36 | DW(2, 1) = 3 * 10 = 30 |

-continued

| For site 102 | For site 104 |
|---|---|
| DW(3, 1) = 6 * 7 = 42 | DW(2, 2) = 3 * 8 = 24 |
| DW(3, 2) = 6 * 9 = 54 | DW(2, 3) = 3 * 6 = 18 |

It is noted that other ways to calculate default weight are contemplated, and the above is simply an example of the implementation of an embodiment of the present invention. It is noted that many different weighting schema may be used to define the initial bandwidth of a tunnel. For example, one may desire to only weight a tunnel in one direction using the downlink capacity of a receiving site and the uplink capacity of the sending site. Any weighting scheme used to characterize capacity of the tunnels at the establishment of the bonded connection may be used for the purposes of the present invention.

When packets are being routed from site 102 to site 104 according to embodiments, the packets will be distributed to the tunnels in a ratio according to an effective weight, EW(x,y). Initially the effective weight of embodiments is set to be equal to the default weight, EW(x,y)=DW(x,y), and if the bandwidth of tunnels 116 remains unchanged from the initial setting, the effective weight is optimal for packet distribution. However, if a user is downloading a file over a bonded network connection in a TCP session with one or more tunnels having packet drops, the overall throughput of the session will drop dramatically. This is in part because the packet drops will keep causing TCP retransmissions and TCP's flow control will maintain a lower throughput even though tunnels without packet drops are not fully occupied.

One effective way to increase throughput would be to avoid such packet drops. To do so, embodiments of the present invention discern when tunnels are experiencing an increase or decrease in packet drop rates at block 203 of the illustrated embodiment. Embodiments further function to modify the effective weight of tunnels which are experiencing or have experienced changes in packet drop rates at block 204. The packet drop rate information may be monitored continuously or be monitored based on specific time periods. Once it is determined that a tunnel is experiencing an unacceptable rate of packet drops (block 204-1), the illustrated embodiment decreases the effective weight of the tunnel at block 204-2. In some embodiments, unacceptable may mean that the packet drop rate is a non-zero quantity, while other embodiments may determine that an unacceptable rate is any rate beyond a predefined threshold. Embodiments implement these decreases in stepwise fashion, in a continuous manner, in a reduction at one time in proportion to the increase in the packet drop rate, etc. When reductions are done in a gradual manner, embodiments may continue to monitor the tunnel in order to optimize the amount of reduction which is implemented.

Tunnels 116 may be established or monitored by sending heartbeat packets through each tunnel from either router 106 or router 108. In some embodiments when the receive end fails to receive heartbeat packets from a tunnel for a period of time, it will treat that tunnel as down and the tunnel will not be used for routing traffic. If heartbeat packets again start being received, the tunnel may be re-established and be weighted along with the other tunnels. As such, in the event that all packets are being dropped in a tunnel and the effective weight of that tunnel is reduced to zero, embodiments may utilize heartbeat packets to monitor and reestablish a connection.

Moreover, when tunnels recover all or part of their respective bandwidths, e.g. it is determined that the packet drop rate decreases (block 204-3), the illustrated embodiment functions to increase the effective weight of such tunnels (block 204-4) in order to fully, or more fully, utilize the bandwidth. Some embodiments increase the effective weight for a tunnel using predetermined step sizes until an accurate effective weight is regained. Other embodiments increase the effective weight proportionate to a newly measured bandwidth which may correspond to a newly measured packet drop rate. Moreover, embodiments may increase the effective weight for a tunnel based on a predetermined linear or exponential scale.

After the effective weight of the tunnels are adjusted, or it is determined that no adjustment is needed, the weighting scheme of the system is updated at block 205 of the illustrated embodiment. This update may comprise storing any processed information, using such information in further processing, causing the system to take no action, etc. For example, processing performed with respect to block 205 may operate to average weighting schemes over a period of time, such as to mitigate error associated with highly transient anomalies. Further, the updated information may be used on system 100 to modify the packet distribution of the data transfer session, as discussed with respect to FIG. 2B. System 100 may continue to implement steps 203-205 continuously or periodically throughout a data transfer session.

Figure 2B:
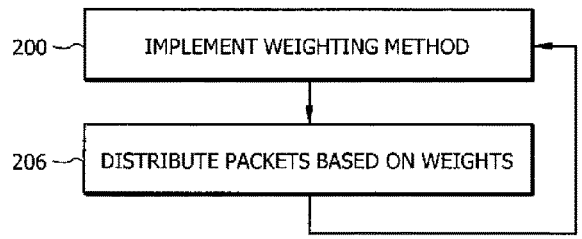
FIG. 2B illustrates a flowchart depicting a method for increasing throughput of a bonded connection in accordance with an embodiment of the present invention.

FIG. 2B illustrates an embodiment where, after weighting method 200 is implemented, the packets are distributed based, at least in part, on the modified weight of the tunnels. Specifically, block 206 of the illustrated embodiment operates to distribute packets across the tunnels in accordance with the weighting scheme determined by operation of method 200. In some embodiments, this distribution will change throughout a data transfer session, and therefore the steps of FIG. 2B are shown as repeating. Some embodiments change the packet distribution each time the system is updated at block 205. Moreover, block 205 may cause changes to be implemented periodically, in response to certain drop rate change thresholds, etc. It should be appreciated that the determination of weighting by operation of method 200 and the application of determined weighting to packet distribution at block 206 may have different periodicity. For example, method 200 may operate to provide updates of weighting scheme information using a relatively short iterative cycle while the distribution of packets is altered based upon such weighting scheme information using a longer iterative cycle.

Figure 3:
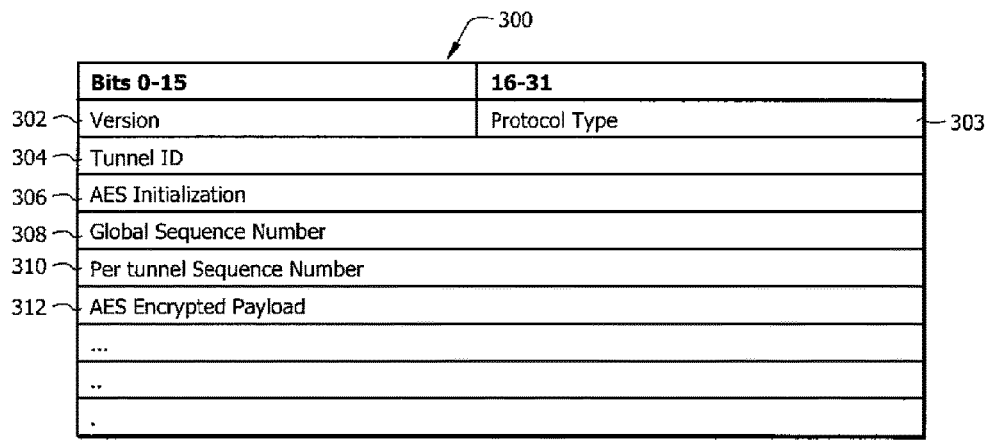
FIG. 3 is an example embodiment illustrating the type of information which may be encapsulated in a transmitted IP packet in accordance with an embodiment of the present invention.

To monitor the bandwidth of the various tunnels 116, some embodiments of the present invention encapsulate each transmitted IP packet with various information. FIG. 3 illustrates an example embodiment showing the type of information 300 which may be encapsulated in a transmitted IP packet. Version field 302 may contain information about the protocol version being utilized and protocol type field 303 may contain the protocol type of the payload packet. In general, the value of this field will correspond to the Ethernet protocol type for the packet. However, additional values may be defined in other documents. Tunnel ID field 304 may be a 32-bit field and may contain an identifier to identify the current tunnel of the IP packet. Advanced Encryption Standard (AES) initialization vector field 306 may be a 32-bit field and may contain an initialization vector for AES encryption. Global sequence number field 308 may be a 32-bit field and may contain a sequence number which is utilized to re-sequence each of the packets for various sessions into the proper order when they have emerged from their respective tunnels. Per tunnel sequence number field 310 may be a 32-bit field which may represent a sequence number that is assigned to each packet routed to a particular tunnel. AES encrypted payload field 312 may be utilized to convey the payload of the IP packet.

The per tunnel sequence number discussed above may be used to monitor dropped packets in a tunnel. In one embodiment the router on the receiving end calculates the packet drop rate of each tunnel, DR(x,y), every f seconds by monitoring the per tunnel sequence number of the received packets. DR(x,y) may be characterized as the sequence numbers missed divided by a sequence number increase for a period f. The length of period f may vary, and in one embodiment f is equal to 5 seconds.

Other methods may also be used to monitor dropped packets, e.g.: the sender may periodically inform the receive end how many packets it has sent, the sender sends a heartbeat packet to the receive end every constant period of time and the receive end can estimate the overall drop rate by monitoring the heartbeat packets' drop rate, by acquiring drop rate figures from physical interface/device/layer, etc.

The receive end may feedback a particular tunnel's drop rate, effective weight, or other bandwidth indicators, to the sending router. When the sender receives information regarding packet drops, some embodiments lower the effective weight EW(x,y) of a tunnel by EW(x,y)·DR(x,y). Other metrics may be used to modify the effective weight of a tunnel. In some embodiments, the sender may receive feedback and the effective weight may be reduced by number that is greater than or less than the packet drop rate. Such variances may be configured according to the particular needs of a communication system. The above example represents a metric that attempts to lower the effective weight of the tunnel to a weight which prevents further packet drops while maximizing the amount of usable bandwidth of the tunnel. Any metric which finds this balance may be preferred.

Figure 4A:
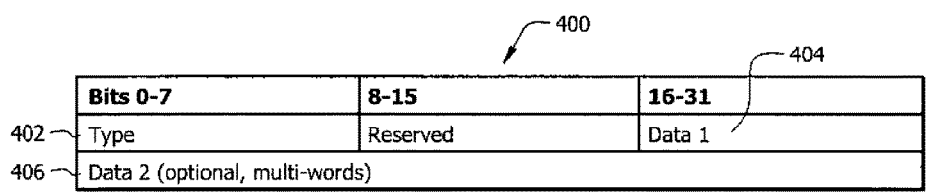
FIG. 4A is an example embodiment illustrating the type of information which may be encapsulated in a feedback packet in accordance with an embodiment of the present invention.

FIG. 4A illustrates an example embodiment of the type of information 400 which may be encapsulated in a feedback packet which is sent to the transmitting router in order to report packet drop rates or other bandwidth related data received at the receiving end router. Type field 402 may include data regarding the type of data that will be included in data 1 field 404 and data 2 field 406.

Data 1 field 404 and data 2 field 406 may contain any information which may be used to assist the router in determining tunnel information with regard to the number of tunnels, bandwidth of tunnels, number of dropped packets in a tunnel, and the like. An example of possible values of the type field 402 in the data fields 404 and 406 is shown in the chart of FIG. 4B.

The information which is encapsulated in transmitted IP packets, such as shown in FIGS. 3-4 may also be used for packet buffering and re-sequencing. Because each tunnel's latency can be different, when two consecutive packets of the same TCP session are sent to a VPN peer over a bonded VPN tunnel, they may not arrive in sequence because they are routed via two different tunnels. If the TCP session receives the out-of-sequence packets from the VPN, the TCP session will slow down due to TCP retransmissions. Accordingly, the receive end should buffer the packets that come too early until either the slower packets arrive or until an expiration time has passed. With such buffering, late packets that come prior to an expiration time will be forwarded to the destination device in sequence. This buffering assists in the optimization of end-to-end throughput.

It is noted that embodiments described herein are, at times, discussed in the context of a VPN connection. These discussions are presented in order to show an example embodiment of a bonded connection. The inventive concepts described in claimed herein are not limited to such connections. In fact, any connection where sufficient data may be obtained and exchanged in order to dynamically monitor the bandwidth of a plurality of communication paths which are being used in a data transfer session may be implemented with the embodiments of the present invention.

As discussed above, each packet may be assigned two different sequence numbers, a global sequence number (GSN) and a per tunnel sequence number (PTSN). These numbers may be used to assist in packet buffering and re-sequencing operations. After a packet is passed to an upper layer, the receive end may update a next expected per-tunnel sequence number (NE-PTSN) and a next expected global sequence number (NE-GSN).

The following will describe one method of how a packet may be buffered or forwarded to destination device after it is received and decrypted.

1. If the packet's GSN equals to zero, forward it to destination device immediately.
2. Check if the packet's PTSN equals to the NE-PTSN. If not, dequeue (forward to destination device) in sequence all packets that have a smaller GSN than the packet's. Keep the packet unprocessed.
3. Update the NE-PTSN (i.e., set NE-PTSN to PTSN+1).
4. If the GSN is less than the NE-GSN, forward to destination device.
5. If the packet's GSN is equal to the NE-GSN, update the NE-GSN (i.e., set NEGSN to GSN+1) and forward to destination device. Repeat updating the NE-GSN and dequeuing the buffer head from the buffer if the head's GSN equals to the new NE-GSN.
6. Otherwise (GSN is larger than the NE-GSN), enqueue the packet in the order of the GSN.
7. If a packet has been in the queue longer than a fixed amount of time, set the NEGSN to the packet's GSN+1 and dequeue in sequence the packet and all packets that have a smaller GSN than the packet's.

Therefore, the encapsulated packet information discussed in FIGS. 2-3 may include information that optimizes overall throughput of the data transmission system, such as 100, both by assisting in the optimization of tunnel bandwidth in response to monitoring packet drop rates, and by assisting in the efficient re-sequencing of received packets in a data transfer session.

Embodiments, or portions thereof, may be embodied in program or code segments operable upon a processor-based system (e.g., computer/processing system or computing platform) for performing functions and operations as described herein. The program or code segments making up the various embodiments may be stored in a computer-readable medium, which may comprise any suitable medium for temporarily or permanently storing such code. Examples of the computer-readable medium include such tangible computer-readable media as an electronic memory circuit, a semiconductor memory device, random access memory (RAM), read only memory (ROM), erasable ROM (EROM), flash memory, a magnetic storage device (e.g., floppy diskette), optical storage device (e.g., compact disk (CD), digital versatile disk (DVD), etc.), a hard disk, and the like.

Embodiments, or portions thereof, may be embodied in a computer data signal, which may be in any suitable form for communication over a transmission medium such that it is readable for execution by a functional device (e.g., processor) for performing the operations described herein. The computer data signal may include any binary digital electronic signal that can propagate over a transmission medium such as electronic network channels, optical fibers, air, electromagnetic media, radio frequency (RP) links, and the like, and thus the data signal may be in the form of an electrical signal, optical signal, radio frequency or other wireless communication signal, etc. The code segments may, in certain embodiments, be downloaded via computer networks such as the Internet, an intranet, LAN, MAN, WAN, the PSTN, a satellite communication system, a cable transmission system, and/or the like.

Figure 5:
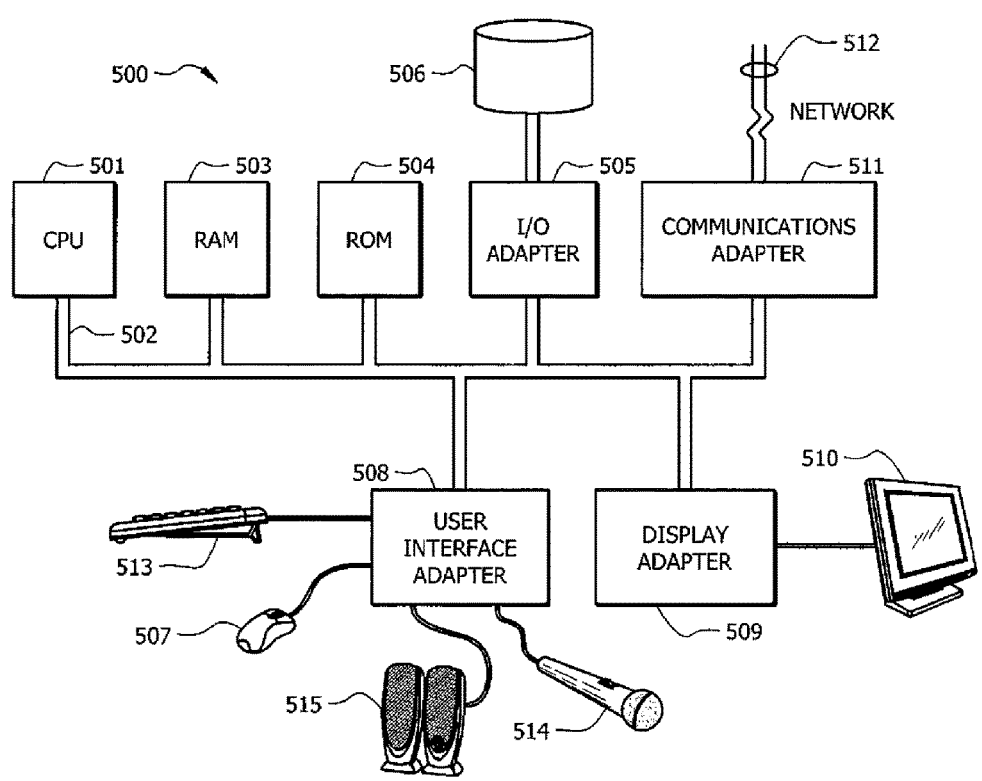
FIG. 5 depicts a block diagram of a processing system which is adapted to implement the present invention.

FIG. 5 illustrates an exemplary processor-based system 500 which may be employed to implement the systems, devices, and methods according to certain embodiments. Central processing unit (CPU) 501 is coupled to system bus 502. CPU 501 may be any general purpose CPU, or may be a special purpose CPU designed to implement the above teachings. The present disclosure is not restricted by the architecture of CPU 501 (or other components of exemplary system 500) as long as CPU 501 (and other components of system 500) supports the inventive operations as described herein. CPU 501 may execute the various logical instructions described herein. For example, CPU 501 may execute machine-level instructions according to the exemplary operational flow described above in conjunction with FIG. 2. When executing instructions representative of the operational steps illustrated in FIG. 2, CPU 501 becomes a special-purpose processor of a special purpose computing platform configured specifically to operate according to the various embodiments of the teachings described herein.

System 500 also includes random access memory (RAM) 503, which may be SRAM, DRAM, SDRAM, or the like. System 500 includes read-only memory (ROM) 504 which may be PROM, EPROM, EEPROM, or the like. RAM 503 and ROM 504 hold user and system data and programs, as are well known in the art.

System 500 also includes input/output (I/O) adapter 505, communications adapter 511, user interface adapter 508, and display adapter 509. I/O adapter 505, user interface adapter 508, and/or communications adapter 511 may, in certain embodiments, enable a user to interact with system 500 in order to input information.

I/O adapter 505 connects storage device(s) 506, such as one or more of hard drive, compact disc (CD) drive, floppy disk drive, tape drive, etc., to system 500. The storage devices are utilized in addition to RAM 503 for the memory requirements associated performing the operations discussed in the above embodiments. Communications adapter 511 is adapted to couple system 500 to network 512, which may enable information to be input to and/or output from system 500 via such network 512 (e.g., the Internet or other wide-area network, a local-area network, a public or private switched telephony network, a wireless network, any combination of the foregoing). User interface adapter 508 couples user input devices, such as keyboard 513, pointing device 507, and microphone 514 and/or output devices, such as speaker(s) 515 to system 500. Display adapter 509 is driven by CPU 501 to control the display on display device 510. Display adapter 509 transmits instructions for transforming or manipulating the state of the various numbers of pixels used by display device 510 to visually present the desired information to a user. Such instructions include instructions for changing state from on to off, setting a particular color, intensity, duration, or the like. Each such instruction makes up the rendering instructions that control how and what is displayed on display device 510.

It shall be appreciated that the present disclosure is not limited to the architecture of system 500. For example, any suitable processor-based device may be utilized for implementing the above teachings, including without limitation routers, personal computers, laptop computers, computer workstations, multi-processor servers, and even mobile telephones. Moreover, certain embodiments may be implemented on application specific integrated circuits (ASICs) or very large scale integrated (VLSI) circuits. In fact, persons of ordinary skill in the art may utilize any number of suitable structures capable of executing logical operations according to the embodiments.

Although embodiments of the present invention and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method for increasing wireless communication throughput of a bonded virtual private network (VPN) tunnel between a first communication router and a second communication router via a first network, comprising:
   a. establishing a plurality of first connections between the first communication router and the first network;
   b. establishing at least one second connection between the second communication router and the first network;
   c. establishing a plurality of tunnels through the plurality of first connections and the at least one second connection;
   d. assigning a respective weight value for each of the plurality of tunnels;
   e. forming the bonded VPN tunnel using the plurality of tunnels;
   f. assigning a per-tunnel sequence number and a global sequence number to each packet routed to a particular tunnel;
   g. distributing packets of a session among the plurality of tunnels based, at least in part, on the respective weight values;
   h. modifying the respective weight value for the plurality of tunnels at a first periodicity in response to an observed packet drop rate;
   i. updating the respective weight value to the modified respective weight value at a second periodicity, wherein the second periodicity is longer than the first periodicity;
   wherein the plurality of first connections are wireless connections;
   wherein the at least one second connection is a wired connection;
   wherein the respective weight value is based on packet throughput and packet drop rate of each tunnel;

wherein the packet drop rate is reported to the first communication router by the second communication router; and wherein the per-tunnel sequence number and global sequence number are used to assist in packets buffering and re-sequencing.

2. The method of claim 1, wherein the plurality of first connections are Wide Area Network (WAN) connections.

3. The method of claim 1 further comprising: increasing the respective weight value as the packet drop rate decreases.

4. The method of claim 3, wherein said increase occurs in predetermined step sizes.

5. The method of claim 1, wherein the first communication router is a mobile device.

6. The method of claim 5, wherein the plurality of first connections are established through a plurality of communication adapters of the first communication router.

7. The method of claim 5, wherein the plurality of first connections are different types of WAN connections.

8. The method of claim 5, wherein the respective weight values comprises of uplink weight values and downlink weight values.

9. The method of claim 5, wherein the packet drop rate is determined by monitoring per tunnel sequence number of packets at the second communication router.

10. A communication system including a first communication router for increasing wireless communication throughput of a bonded virtual private network (VPN) tunnel between the first communication router and a second communication router via a first network;

the first communication router comprising:
a plurality of network interfaces;
at least one processing unit;
at least one non-transitory computer readable storage medium for storing program instructions executable by the at least one processing unit for:
 a. establishing a plurality of first connections between the first communication router and the first network;
 b. establishing at least one second connection between the second communication router and the first network;
 c. establishing a plurality of tunnels through the plurality of first connections and the at least one second connection;
 d. assigning a respective weight value for each of the plurality of tunnels;
 e. forming the bonded VPN tunnel using the plurality of tunnels;
 f. assigning a per-tunnel sequence number and a global sequence number to each packet routed to a particular tunnel;
 g. distributing packets of a session among the plurality of tunnels based, at least in part, on the respective weight values;
 h. modifying the respective weight value for the plurality of tunnels at a first periodicity in response to an observed packet drop rate;
 i. updating the respective weight value to the modified respective weight value at a second periodicity, wherein the second periodicity is longer than the first periodicity;

wherein the plurality of first connections are wireless connections;

wherein the at least one second connection is a wired connection;

wherein the respective weight value is based on packet throughput and packet drop rate of each tunnel;

wherein the packet drop rate is reported to the first communication router by the second communication router; and wherein the per-tunnel sequence number and global sequence number are used to assist in packets buffering and re-sequencing.

11. The communication system of claim 10, wherein the plurality of first connections are Wide Area Network (WAN) connections.

12. The communication system of claim 10, wherein the at least one first non-transitory computer readable storage medium stores program instructions executable by the at least one first processing unit for increasing the respective weight value as the packet drop rate decreases.

13. The communication system of claim 12, wherein said increase occurs in predetermined step sizes.

14. The communication system of claim 10, wherein the first communication router is a mobile device.

15. The communication system of claim 14, wherein the plurality of first connections are established through a plurality of communication adapters of the first communication router.

16. The communication system of claim 14, wherein the plurality of first connections are different types of WAN connections.

17. The communication system of claim 14, wherein the respective weight values coprise uplink weight values and downlink weight values.

18. The communication system of claim 14, wherein the packet drop rate is determined by monitoring per-tunnel sequence number of packets at the second communication router.

* * * * *